United States Patent
Okami et al.

(10) Patent No.: US 11,423,561 B2
(45) Date of Patent: Aug. 23, 2022

(54) LEARNING APPARATUS, ESTIMATION APPARATUS, LEARNING METHOD, ESTIMATION METHOD, AND COMPUTER PROGRAMS

(71) Applicant: NIPPON TELEGRAPH AND TELEPHONE CORPORATION, Tokyo (JP)

(72) Inventors: Kazuki Okami, Musashino (JP); Megumi Isogai, Musashino (JP); Masaaki Matsumura, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 198 days.

(21) Appl. No.: 16/967,393

(22) PCT Filed: Feb. 8, 2019

(86) PCT No.: PCT/JP2019/004733
§ 371 (c)(1),
(2) Date: Aug. 4, 2020

(87) PCT Pub. No.: WO2019/156241
PCT Pub. Date: Aug. 15, 2019

(65) Prior Publication Data
US 2021/0174526 A1    Jun. 10, 2021

(30) Foreign Application Priority Data
Feb. 9, 2018    (JP) .............................. JP2018-022350

(51) Int. Cl.
*G06T 7/55* (2017.01)
*G06N 3/08* (2006.01)

(52) U.S. Cl.
CPC ................. *G06T 7/55* (2017.01); *G06N 3/08* (2013.01); *G06T 2207/20081* (2013.01);
(Continued)

(58) Field of Classification Search
None
See application file for complete search history.

(56) References Cited

U.S. PATENT DOCUMENTS

2017/0055844 A1* 3/2017 Umezawa ............ A61B 5/0091

FOREIGN PATENT DOCUMENTS

| CN | 104866869 A * 8/2015 ........... G06K 9/6269 |
| JP | 2013120504 A * 6/2013 |

(Continued)

OTHER PUBLICATIONS

Zhe Cao et al. "Realtime Multi-Person 2D Pose Estimation using Part Affinity Fields." IEEE Conference on Computer Vision and Pattern Recognition (CVPR). Apr. 14, 2017.

*Primary Examiner* — Jiangeng Sun

(57) ABSTRACT

A learning device includes: a time-series information generation unit that obtains a first image group including a plurality of successive time-series images including a reference image and generates first time-series information based on a difference between the reference image and each of the images in the first image group other than the reference image; and a first learning unit that performs machine learning using the reference image and the first time-series information, thereby obtaining a first learning result used for estimating depth information on a target image, which is an image to be processed, and silhouette information on a subject captured in the target image based on the target image and second time-series information generated from a second image group including a plurality of successive time-series images including the target image.

8 Claims, 7 Drawing Sheets

(52) U.S. Cl.
CPC ............... *G06T 2207/20084* (2013.01); *G06T 2207/20224* (2013.01); *G06T 2207/30196* (2013.01)

(56) References Cited

FOREIGN PATENT DOCUMENTS

| | | | | | |
|---|---|---|---|---|---|
| JP | 2017042590 | A | * | 3/2017 | ........... A61B 5/0095 |
| KR | 101862545 | B1 | * | 5/2018 | |
| WO | WO-2017187719 | A1 | * | 11/2017 | ............. A01K 29/00 |

* cited by examiner

LEARNING APPARATUS, ESTIMATION APPARATUS, LEARNING METHOD, ESTIMATION METHOD, AND COMPUTER PROGRAMS

CROSS-REFERENCE TO RELATED APPLICATIONS

This application is a 371 U.S. National Phase of International Application No. PCT/JP2019/004733, filed on Feb. 8, 2019, which claims priority to Japanese Application No. 2018-022350, filed on Feb. 9, 2018. The entire disclosures of the above applications are incorporated herein by reference.

TECHNICAL FIELD

The present invention relates to a learning device, an estimation device, a learning method, an estimation method and a computer program.

BACKGROUND ART

Techniques for measuring motions of joints of a human being can be applied to enhance the liveliness of computer-graphics characters mimicking human beings in movies and the like. Therefore, the techniques for measuring motions of joints of a human being are essential for improving the quality of contents. The techniques for measuring motions of joints of a human being are also widely used in other fields than the field of entertainment including movies described above. For example, in the medical field, the techniques for measuring motions of joints of a human being are important to provide information on the conditions of patients.

As described above, the information on a motion of a joint of a human being (referred to as "joint information" hereinafter) is important in various fields. However, it takes massive effort to acquire the joint information. An example of the technique for acquiring the joint information is a data acquisition technique based on motion capture. The motion capture requires a person to be measured to wear a special suit before making motions, and involves complicated tasks, such as performing calibration of the space in advance. Other techniques than the motion capture also have various problems. For example, such techniques may require special equipment, or applications thereof may be limited to certain environments.

To avoid such problems, there is a technique of robustly estimating the joint information on a subject in an image by using deep learning (see Non-Patent Literature 1, for example). The technique can robustly estimate the joint information even if there is a plurality of persons captured in an image.

CITATION LIST

Patent Literature

Non-Patent Literature

Non-Patent Literature 1: Zhe Cao, Tomas Simon, Shih-En Wei, Yaser Sheikh, "Realtime Multi-Person 2D Pose Estimation using Part Affinity Fields", IEEE Conference on Computer Vision and Pattern Recognition (CVPR), April 2017

SUMMARY OF THE INVENTION

Technical Problem

When a plurality of persons is captured in an image, some of the persons may overlap with each other. For example, in an image of a scene in which persons tend to gather, such as a scene of a sports game, a region (referred to as an "occlusion region" hereinafter) inevitably occurs in which the persons overlap with each other, and a person in the background is partially hidden by a person in the foreground. In order to widen the application of the joint information obtained from such an image, it is necessary to accurately estimate the information on any joint of a person in the occlusion region.

However, the prior art has a problem in that, for an image including an occlusion region, the accuracy of the estimation of the information on a joint of a person in the occlusion region particularly tends to decrease. According to some prior art, to avoid an erroneous estimation, the estimation of the joint information may be omitted in the occlusion region. If an erroneous estimation occurs, or the estimation is omitted in the occlusion region, it is difficult to apply the resulting joint information to production of computer graphics or animations, for example.

The present invention has been devised in view of such circumstances, and an object of the present invention is to provide a learning device that can learn information on a joint of a subject in an occlusion region in an image, an estimation device, a learning method, an estimation method and a computer program.

Means for Solving the Problem

An aspect of the present invention is a learning device, comprising: a time-series information generation unit that obtains a first image group including a plurality of successive time-series images including a reference image and generates first time-series information based on a difference between the reference image and each of the images in the first image group other than the reference image; and a first learning unit that performs machine learning using the reference image and the first time-series information, thereby obtaining a first learning result that is to be used for estimating depth information on a target image, which is an image to be processed, and silhouette information on a subject captured in the target image based on the target image and second time-series information generated from a second image group including a plurality of successive time-series images including the target image.

An aspect of the present invention is the learning device described above, wherein the first learning unit obtains the first learning result, which indicates configuration information and parameter information on a deep neural network that receives the reference image and the first time-series information and outputs the depth information on the reference image and the silhouette information on the subject captured in the reference image.

An aspect of the present invention is an estimation device, comprising: a first estimation unit that estimates the depth information on the target image and the silhouette information on the subject captured in the target image by using the first learning result obtained from the learning device described above, the target image and the second time-series information.

An aspect of the present invention is the estimation device described above, further comprising: a second learning unit that performs machine learning using the silhouette information on the subject captured in the reference image, thereby obtaining a second learning result that is to be used for estimating joint information on the subject captured in the target image using the silhouette information on the subject captured in the target image; and a second estimation unit that estimates the joint information on the subject captured in the target image by using the silhouette information on the subject captured in the target image and the second learning result.

An aspect of the present invention is a learning method, comprising: a time-series information generation step of obtaining a first image group including a plurality of successive time-series images including a reference image and generating first time-series information based on a difference between the reference image and each of the images in the first image group other than the reference image; and a learning step of performing machine learning using the reference image and the first time-series information, thereby obtaining a learning result that is to be used for estimating depth information on a target image, which is an image to be processed, and silhouette information on a subject captured in the target image based on the target image and second time-series information generated from a second image group including a plurality of successive time-series images including the target image.

An aspect of the present invention is an estimation method, comprising: an estimation step of estimating the depth information on the target image and the silhouette information on the subject captured in the target image by using the learning result obtained by the learning method described above, the target image and the second time-series information.

An aspect of the present invention is a computer program that makes a computer function as the learning device described above.

An aspect of the present invention is a computer program that makes a computer function as the estimation device described above.

Effects of the Invention

According to the present invention, information on a joint of a subject in an occlusion region in an image can be learnt.

DESCRIPTION OF EMBODIMENTS

Embodiment

In the following, an embodiment of the present invention will be described with reference to the drawings.

[Configuration of Estimation Device]

In the following, a configuration of an estimation device 1 will be schematically described.

The estimation device 1 is a device that estimates joint information on a subject captured in an image (a frame of a video, for example). In particular, the estimation device 1 estimates information on a joint in an occlusion region of a subject in the background from an image containing a plurality of subjects overlapping with each other in the depth direction.

Occlusion region refers to a part or the whole region of a subject in the background hidden by a subject in the foreground overlapping with that subject, as described above.

The estimation device 1 receives an image for which joint information is to be estimated (referred to as a "target image" hereinafter), and estimates and outputs joint information. Joint information refers to information on a motion of a joint of a subject, as described above. The joint information includes information on what joint of the subject the relevant joint is and information on the position of the joint.

The following description will be made on the assumption that the subject is a person. However, the subject is not limited to a person but may be any other living thing or non-living thing that has a joint, such as animals, insects or robots.

Figure 1:
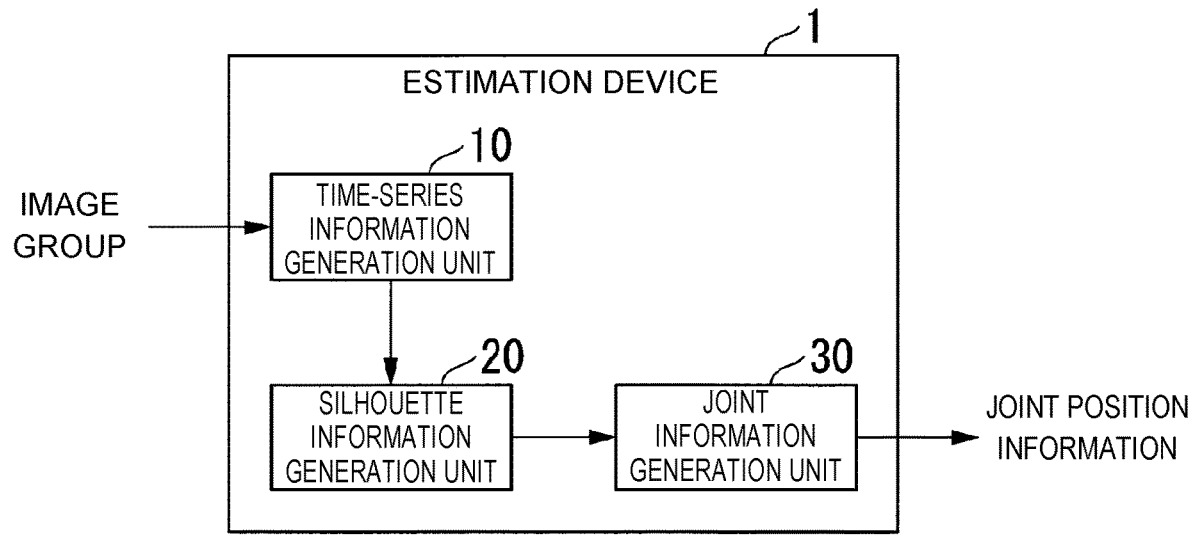
FIG. 1 is a schematic block diagram showing a configuration of an estimation device.

FIG. 1 is a schematic block diagram showing a configuration of the estimation device 1. As shown in FIG. 1, the estimation device 1 includes a time-series information generation unit 10, a silhouette information generation unit 20, and a joint information generation unit 30.

The time-series information generation unit 10 acquires an image group including a plurality of successive time-series images (frames).

The time-series information generation unit 10 generates information (referred to as "difference information" hereinafter) based on the difference between a target image, which is one of the images included in the image group, and each of the other images than the target image.

Difference information refers to information on the difference between a target image and other images than the target image. The set of the generated difference information will be referred to as "time-series information" hereinafter. As the difference information, the amount of movement of each pixel indicated by an optical flow, which represents a motion of an object by a vector, can be used, for example.

The time-series information generation unit 10 outputs the target image and the generated time-series information to the silhouette information generation unit 20.

The silhouette information generation unit 20 obtains the target image and the time-series information output by the time-series information generation unit 10. Using the obtained target image and time-series information, the silhouette information generation unit 20 estimates depth information in the target image and silhouette information on a person captured in the target image. Depth information refers to information that indicates the distance from a camera to a captured object on a pixel basis. Silhouette information refers to information that indicates a silhouette of a person having an occlusion region in an image (that is, a person in the background).

For the estimation of the depth information in the target image and the estimation of the silhouette information, a machine learning scheme, such as a deep neural network (DNN), is used, for example. The depth information and the silhouette information may be estimated sequentially or at the same time. The following description will be made on the assumption that the depth information and the silhouette information are sequentially estimated.

The silhouette information generation unit 20 outputs the estimated silhouette information to the joint information generation unit 30.

The joint information generation unit 30 obtains the silhouette information output by the silhouette information generation unit 20. Using the obtained silhouette information, the joint information generation unit 30 estimates joint information on the person captured in the target image. Joint information refers to information on a motion of a joint of a subject (a person, in this embodiment), described above.

For the estimation of the joint information on the person captured in the target image, a machine learning scheme such as a DNN is used, for example. The joint information generation unit 30 outputs the estimated joint information to an external device.

[Operations of Estimation Process by Estimation Device]

In the following, an example of operations of an estimation process by the estimation device 1 will be described.

Figure 2:
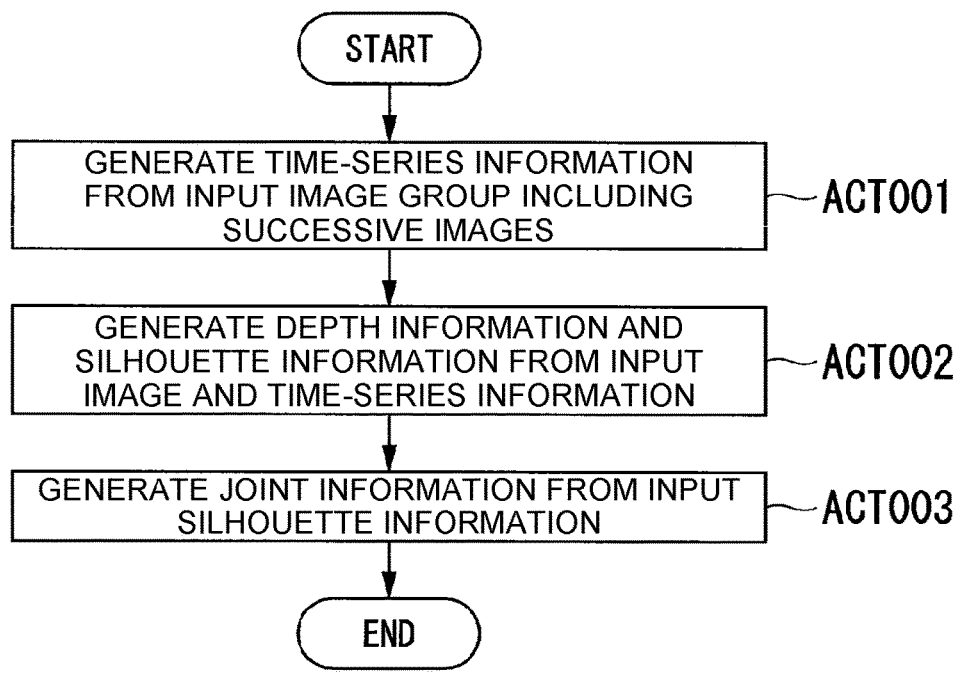
FIG. 2 is a flowchart showing operations of an estimation process by the estimation device.

FIG. 2 is a flowchart showing operations of the estimation process by the estimation device 1.

The time-series information generation unit 10 receives an image group including a plurality of successive time-series images (frames), and generates time-series information that is based on the difference between a target image and each of the other images than the target image in the obtained image group (ACT001).

The silhouette information generation unit 20 receives the target image and the time-series information generated by the time-series information generation unit 10, and generates depth information in the target image and silhouette information on a person captured in the target image (ACT002).

The joint information generation unit 30 receives the silhouette information generated by the silhouette information generation unit 20, and generates joint information on the person captured in the target image (ACT003).

This is the end of the operations of the estimation process by the estimation device 1 shown in the flowchart of FIG. 2.

In the following, configurations of the time-series information generation unit 10, the silhouette information generation unit 20 and the joint information generation unit 30 will be described in more detail with reference to drawings.

[Functional Configuration of Time-Series Information Generation Unit]

In the following, a functional configuration of the time-series information generation unit 10 will be described.

Figure 3:
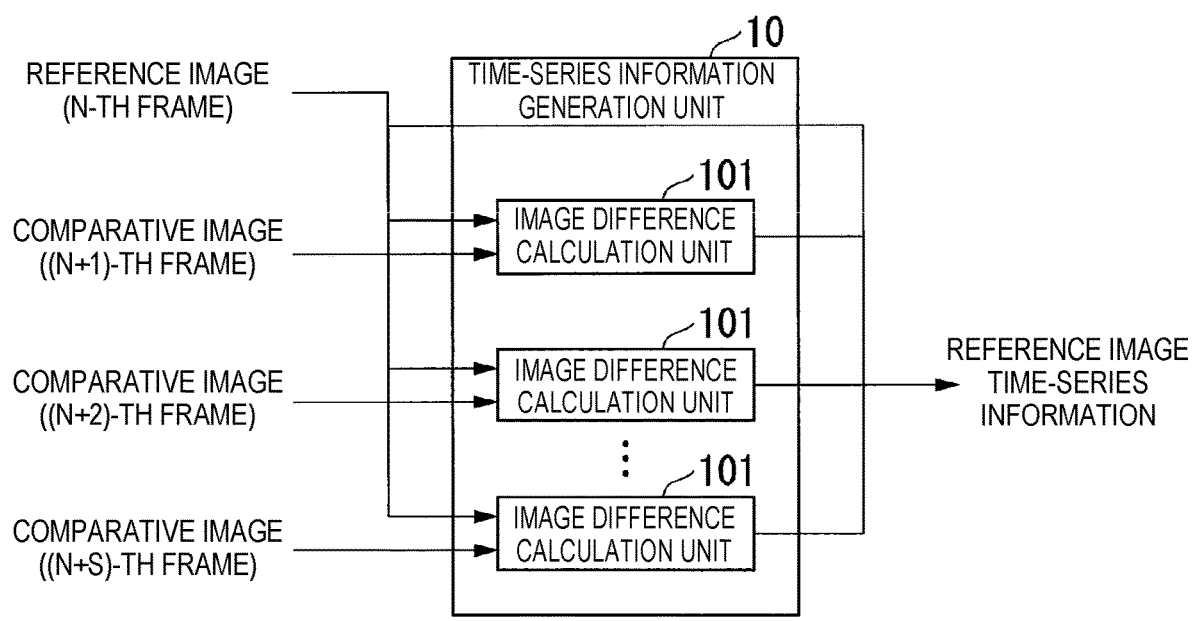
FIG. 3 is a block diagram showing a functional configuration of a time-series information generation unit.

FIG. 3 is a block diagram showing a functional configuration of the time-series information generation unit 10. As shown in FIG. 3, the time-series information generation unit 10 includes S image difference calculation unit 101. S represents any integer value, which corresponds to the maximum value of the number of comparative images described later.

The time-series information generation unit 10 first designates one of the images in a received image group as a reference image. The time-series information generation unit 10 determines the number S of the images (referred to as "comparative images" hereinafter) to be compared with the reference image. The time-series information generation unit 10 extracts a group of S successive images (frames) including the reference image from the received image group.

The process performed by the estimation device 1 include a processing of performing machine learning using learning data and a processing of estimating the joint information based on the learning result of the machine learning and the image group including the target image. In the learning processing, the "reference image" described above is an image for which the learning of the joint information is to be performed. In the estimation processing, the "reference image" described above is an image for which the estimation of the joint information is to be performed (that is, the target image described above).

Provided that the reference image is the image of the N-th frame, the S image difference calculation units 101 each use the image of the (N+a)-th frame as an image (referred to as a "comparative image" hereinafter) to be compared with the reference image. The symbol "a" represents an integer equal to or greater than 1 and equal to or smaller than S. The symbol S represents any integer equal to or greater than 1. The image difference calculation unit 101 calculates difference information based on the difference between the reference image and the comparative image.

In the following, the X-th frame will be referred to as an "X-frame". The symbol "X" represents any integer equal to or greater than 1.

For example, two images separated in x and y directions on an image plane by calculating an optical flow can be treated as one unit of difference information. However, the difference information is not limited to this type of information. The difference information may be information in units of another combination of images (one image, three images or four images, for example). Alternatively, the difference information may be information generated by a processing different from the optical flow calculation.

The time-series information generation unit 10 outputs the reference image and the time-series information including the S pieces of difference information calculated by the S image difference calculation units 101 to the silhouette information generation unit 20.

[Operations of Time-Series Information Generation Process by Time-Series Information Generation Unit]

In the following, an example of operations of a time-series information generation process by the time-series information generation unit 10 will be described.

Figure 4:
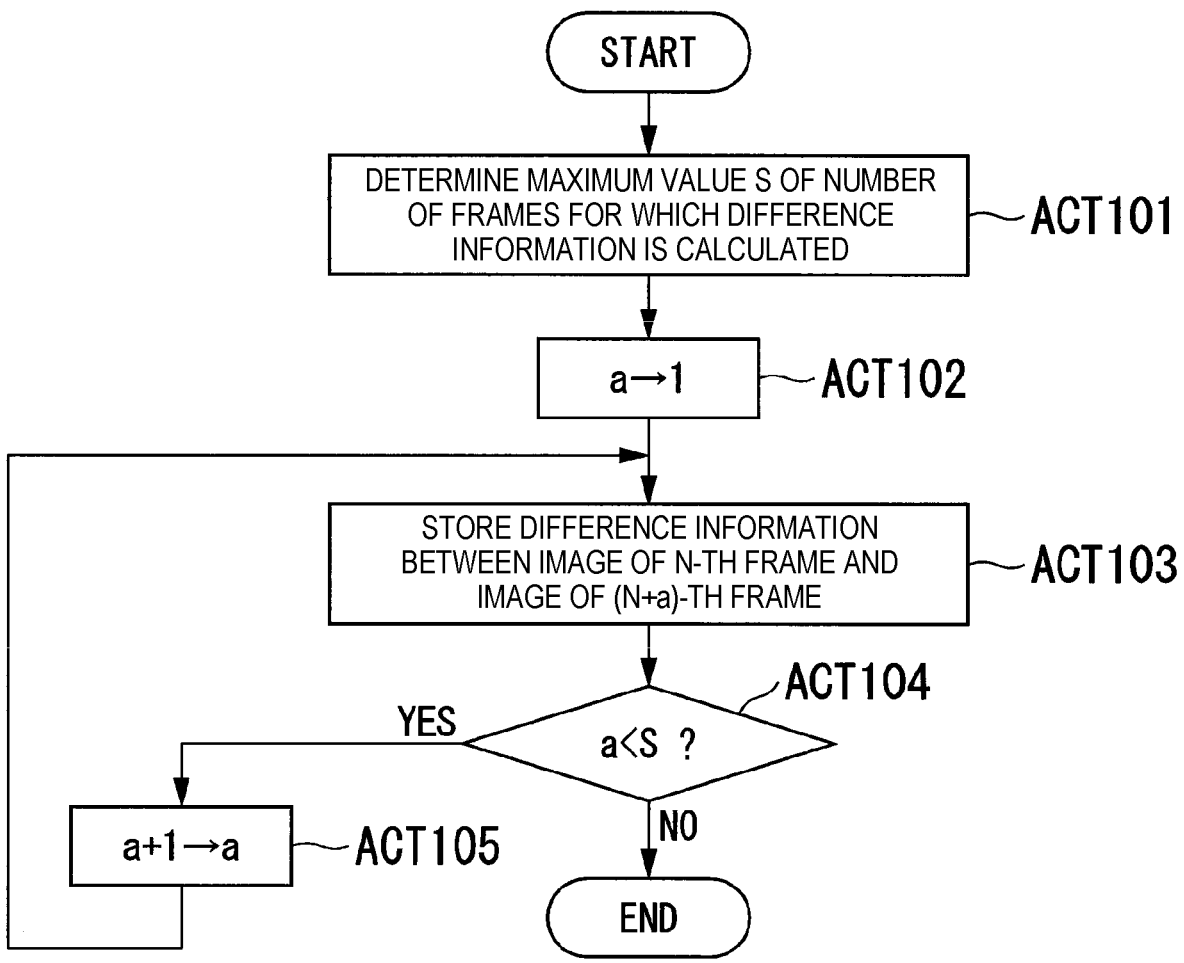
FIG. 4 is a flowchart showing operations of a time-series information generation process by the time-series information generation unit.

FIG. 4 is a flowchart showing operations of a time-series information generation process by the time-series information generation unit 10.

First, the time-series information generation unit 10 determines the maximum value S of the number of frames (number of images to be compared with the reference image) for which the difference information is to be calculated (ACT101).

The time-series information generation unit 10 then sets "a" at 1 (ACT102), and the image difference calculation unit 101 calculates the difference information between the image of the N-th frame and the image of the (N+a)-th frame. The time-series information generation unit 10 stores the calculated difference information in a temporary storage area (not shown) (ACT103). The temporary storage area is formed by a storage medium such as a semiconductor memory or a magnetic disk, for example.

If the value of "a" is smaller than S (YES in ACT104), the value of "a" plus 1 is designated as a new value of "a" (that is, the value of "a" is incremented) (ACT105). The time-series information generation unit 10 repeats the processing of calculating the difference information between the image of the N-th frame and the image of the (N+a)-th frame by the image difference calculation unit 101 until the value of "a" becomes equal to or greater than S. In this way, the time-series information including S pieces of difference information is stored in the temporary storage area (not shown).

If the value of "a" is equal to or greater than S (NO in ACT104), the operations of the time-series information generation process by the time-series information generation unit 10 shown in the flowchart of FIG. 4 end.

[Functional Configuration of Silhouette Information Generation Unit]

In the following, a functional configuration of the silhouette information generation unit 20 will be described.

Figure 5:
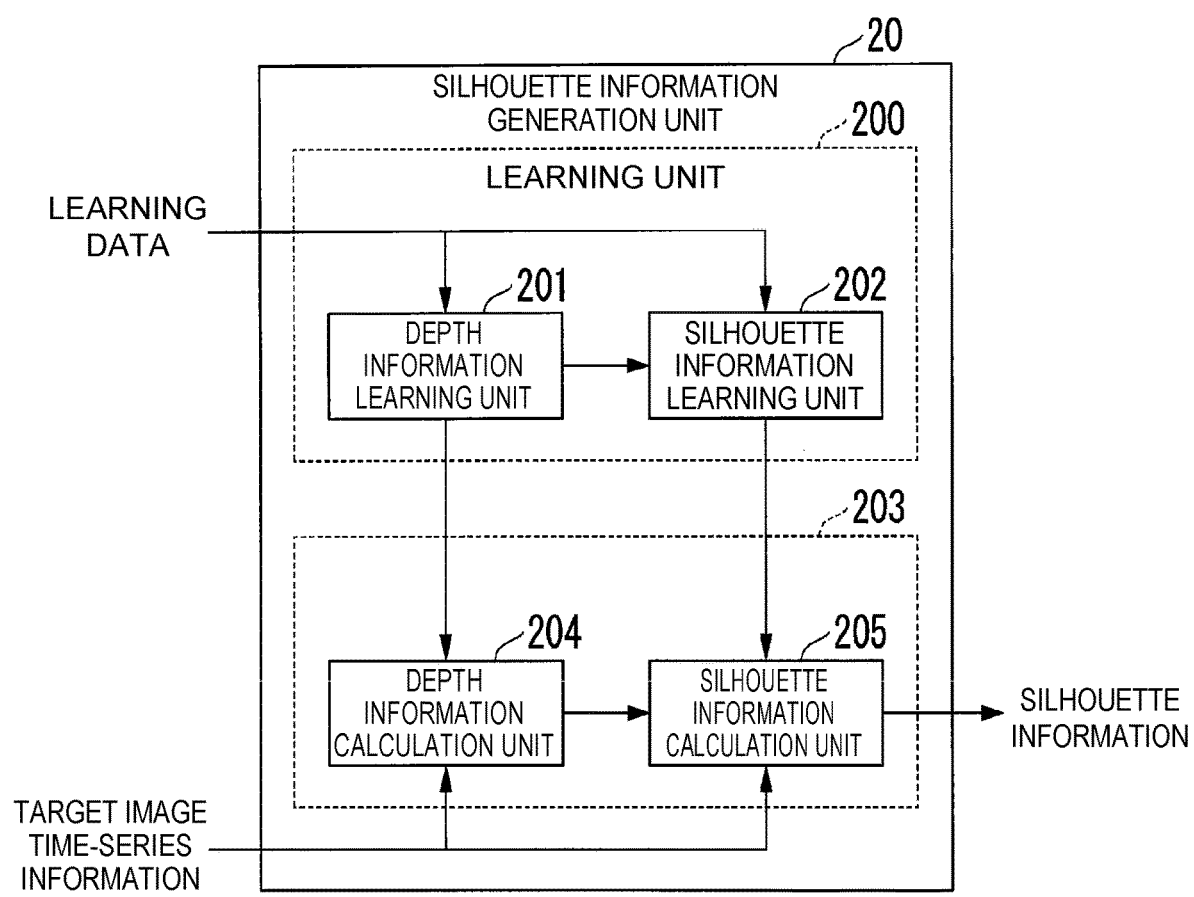
FIG. 5 is a block diagram showing a functional configuration of a silhouette information generation unit.

FIG. 5 is a block diagram showing a functional configuration of the silhouette information generation unit 20. As shown in FIG. 5, the silhouette information generation unit 20 includes a learning unit 200 and an estimation unit 203.

The learning unit 200 (first learning unit) performs machine learning using learning data, which includes a reference image and time-series information (first time-series information) generated from an image group (first image group) including a plurality of successive time-series images (frames) including the reference image. In this way, the learning unit 200 obtains a learning result (first learning result) that is to be used for estimating the depth information on a target image, which is an image to be processed, and the silhouette information on a subject captured in the target image, based on the target image and time-series information (second time-series information) generated from an image group (second image group) including a plurality of successive time-series images (frames) including the target image.

As shown in FIG. 5, the learning unit 200 includes a depth information learning unit 201 and a silhouette information learning unit 202.

The depth information learning unit 201 obtains a learning result (referred to as a "depth learning result" hereinafter) by performing machine learning using learning data. The depth learning result referred to in this embodiment is a learning result that is to be used for estimating the depth information on a target image, which is an image to be processed, from the target image.

As a machine learning scheme, a DNN that estimates depth information from a color image can be used. However, the machine learning scheme used in this embodiment is not limited to the DNN but may be other machine learning schemes. When the DNN is used, the input learning data is a plurality of pieces of combination data of a reference image and depth information. The learning result includes DNN configuration information and parameter information, for example. The depth information obtained by the learning may be output to the silhouette information learning unit 202 and used for learning of the silhouette information.

The silhouette information learning unit 202 obtains a learning result (referred to as a "silhouette learning result" hereinafter) by performing machine learning using learning data. The silhouette learning result referred to in this embodiment is a learning result that is to be used for estimating the silhouette information on a subject (person) captured in a target image, which is an image to be processed, based on the target image, and time-series information generated from an image group (second image group) including a plurality of successive time-series images including the target image, and depth information calculated by a depth information calculation unit 204.

As the machine learning scheme, the DNN can be used. However, the machine learning scheme used in this embodiment is not limited to the DNN but may be other machine learning schemes. When the DNN is used, the input learning data is a plurality of pieces of combination data of a reference image, time-series information (first time-series information) and silhouette information, for example. The learning result includes DNN configuration information and parameter information, for example. As the learning data, the depth information output from the depth information learning unit 201 may be additionally used.

The estimation unit 203 (first estimation unit) estimates depth information on a target image and silhouette information on a subject captured in the target image by using the learning result (first learning result including depth learning result and silhouette learning result) obtained from the learning unit 200, the target image, and time-series information (second time-series information). As shown in FIG. 5, the estimation unit 203 includes a depth information calculation unit 204 and a silhouette information calculation unit 205.

The depth information calculation unit 204 calculates depth information based on the target image and the time-series information (second time-series information) obtained from the time-series information generation unit 10, and the depth learning result obtained from the depth information learning unit 201. The depth information calculation unit 204 outputs the calculated depth information to the silhouette information calculation unit 205.

As a scheme of estimation (generation of the depth information) based on machine learning, the DNN can be used. However, the machine learning scheme used in this embodiment is not limited to the DNN but may be other machine learning schemes.

The silhouette information calculation unit 205 calculates silhouette information based on the target image and time-series information (second time-series information) obtained from the time-series information generation unit 10, the depth information obtained from the depth information calculation unit 204, and the silhouette learning result obtained from the silhouette information learning unit 202. The silhouette information calculation unit 205 outputs the calculated silhouette information to the joint information generation unit 30.

As a scheme of estimation (generation of the silhouette information) based on machine learning, the DNN can be used. However, the machine learning scheme used in this embodiment is not limited to the DNN but may be other machine learning schemes.

[Operations of Learning Process by Silhouette Information Generation Unit]

In the following, an example of operations of a learning process by the silhouette information generation unit 20 will be described.

Figure 6:
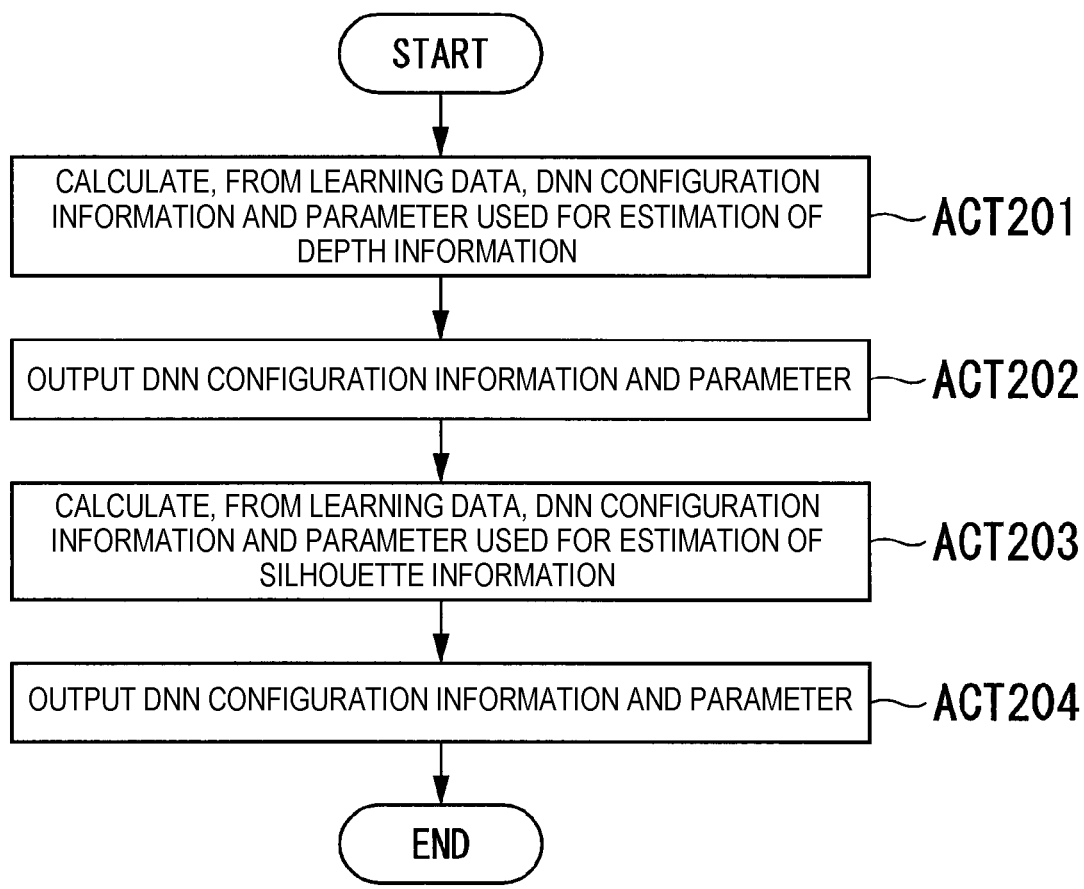
FIG. 6 is a flowchart showing operations of a learning process by the silhouette information generation unit.

FIG. 6 is a flowchart showing operations of a learning process by the silhouette information generation unit 20. The following description will be made on the assumption that the DNN is used as the machine learning scheme.

The depth information learning unit 201 calculates, from the learning data, DNN configuration information and a parameter used for estimation of the depth information (ACT201). The depth information learning unit 201 outputs the calculated DNN configuration information and parameter to the depth information calculation unit 204 (ACT202).

The silhouette information learning unit 202 calculates, from the learning data, DNN configuration information and a parameter used for estimation of the silhouette information (ACT203). The silhouette information learning unit 202 outputs the calculated DNN configuration information and parameter to the silhouette information calculation unit 205 (ACT204).

This is the end of the learning process by the silhouette information generation unit 20 shown in the flowchart of FIG. 6.

[Operations of Estimation Process by Silhouette Information Generation Unit]

In the following, an example of operations of an estimation process by the silhouette information generation unit 20 will be described.

Figure 7:
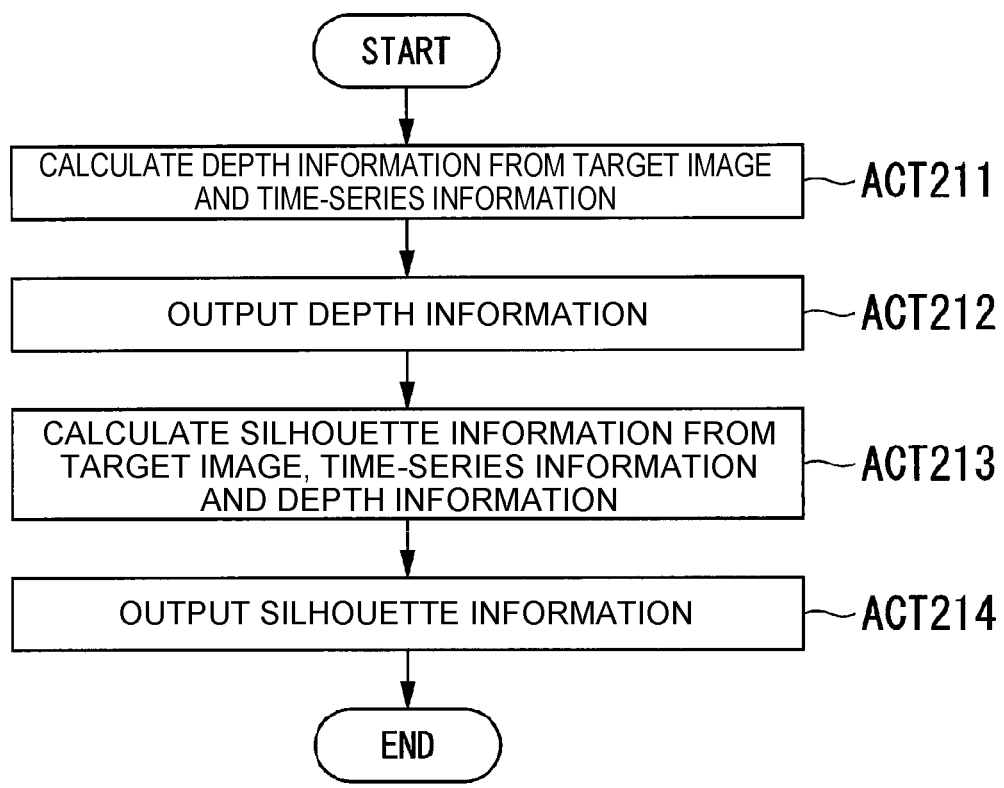
FIG. 7 is a flowchart showing operations of an estimation process by the silhouette information generation unit.

FIG. 7 is a flowchart showing operations of an estimation process by the silhouette information generation unit 20. The following description will be made on the assumption that the DNN is used as the scheme of estimation based on machine learning.

The depth information calculation unit 204 calculates depth information using the DNN based on the target image and time-series information obtained from the time-series information generation unit 10 and the depth learning result obtained from the depth information learning unit 201 (ACT211). The depth information calculation unit 204 outputs the calculated depth information to the silhouette information calculation unit 205 (ACT212).

The silhouette information calculation unit 205 calculates silhouette information based on the target image and time-series information obtained from the time-series information generation unit 10, the depth information obtained from the depth information calculation unit 204, and the depth learning result obtained from the depth information learning unit 201 (ACT213). The silhouette information calculation unit 205 outputs the calculated silhouette information to the joint information generation unit 304 (ACT214).

This is the end of the operations of the estimation process by the silhouette information generation unit 20 shown in the flowchart of FIG. 7.

[Functional Configuration of Joint Information Generation Unit]

In the following, a functional configuration of the joint information generation unit 30 will be described.

Figure 8:
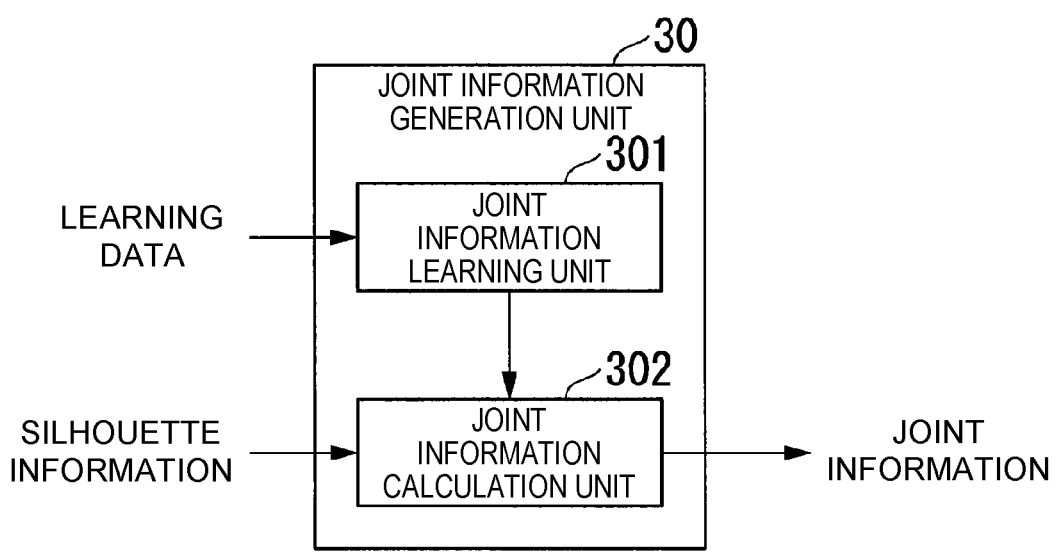
FIG. 8 is a block diagram showing a functional configuration of a joint information generation unit.

FIG. 8 is a block diagram showing a functional configuration of the joint information generation unit 30. As shown in FIG. 8, the joint information generation unit 30 includes a joint information learning unit 301 and a joint information calculation unit 302.

The joint information learning unit 301 (second learning unit) obtains a learning result (referred to as a "joint learning result" hereinafter) by performing machine learning using learning data. The "joint learning result" (second learning result) referred to herein is a learning result that is to be used for estimating joint information from the silhouette information generated by the silhouette information generation unit 20.

As the machine learning scheme, the DNN can be used. However, the machine learning scheme used in this embodiment is not limited to the DNN but may be other machine learning schemes. When the DNN is used, the learning data is a plurality of pieces of combination data of silhouette information and joint information. The learning result includes DNN configuration information and parameter information, for example.

The joint information calculation unit 302 (second estimation unit) calculates joint information based on the silhouette information obtained from the silhouette information generation unit 20 and the joint learning result obtained from the joint information learning unit 301. The joint information calculation unit 302 outputs the calculated joint information to an external device.

[Operations of Learning Process by Joint Information Generation Unit]

In the following, an example of operations of a learning process by the joint information generation unit 30 will be described.

Figure 9:
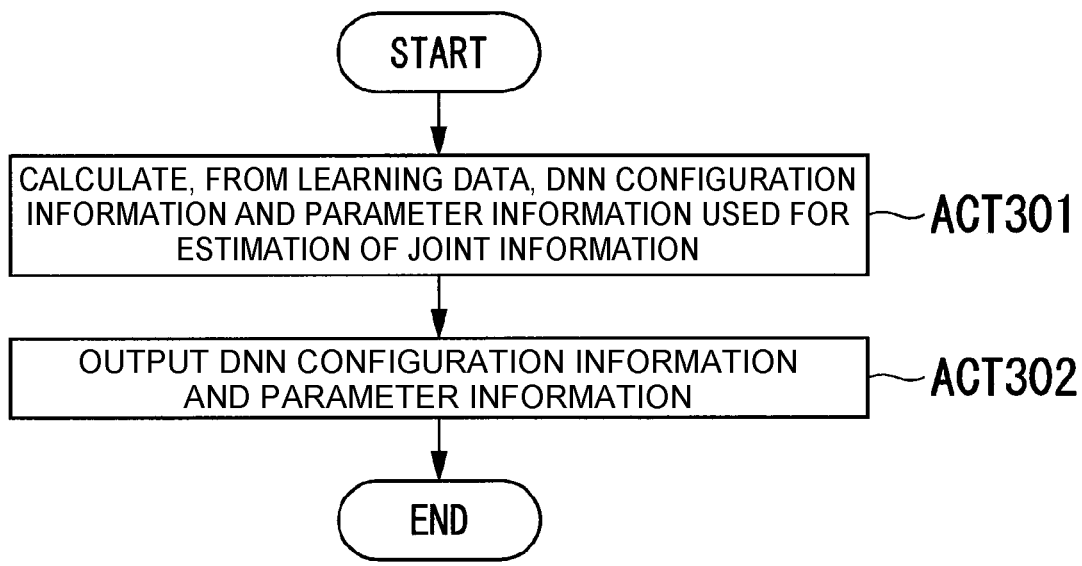
FIG. 9 is a flowchart showing operations of a learning process by the joint information generation unit.

FIG. 9 is a flowchart showing operations of a learning process by the joint information generation unit 30. The following description will be made on the assumption that the DNN is used as the machine learning scheme.

The joint information learning unit 301 calculates, from the learning data, the DNN configuration information and parameter used for estimation of the joint information (ACT301). The joint information learning unit 301 outputs the calculated DNN configuration information and parameter to the joint information calculation unit 302 (ACT302).

This is the end of the operations of the learning process by the joint information generation unit 30 shown in the flowchart of FIG. 9.

[Operations of Estimation Process by Joint Information Generation Unit]

In the following, an example of operations of an estimation process by the joint information generation unit 30 will be described.

Figure 10:
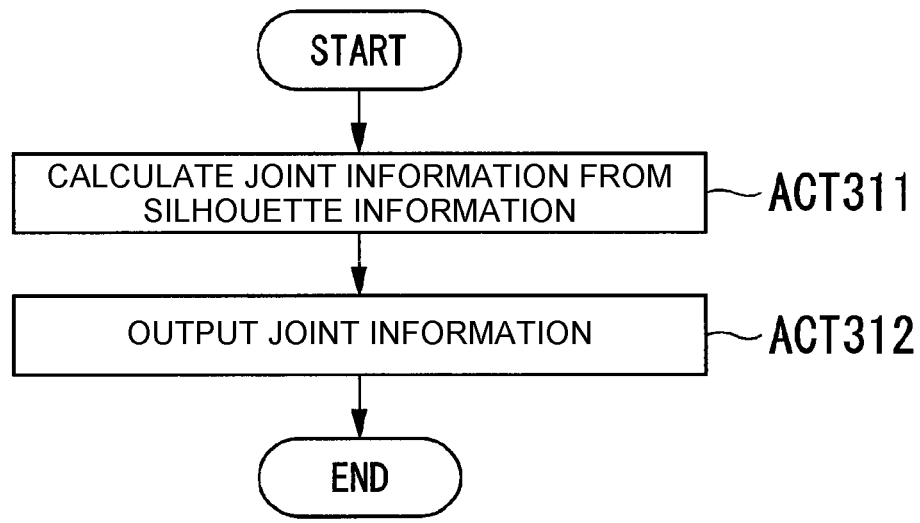
FIG. 10 is a flowchart showing operations of an estimation process by the joint information generation unit.

FIG. 10 is a flowchart showing operations of an estimation process by the joint information generation unit 30. The following description will be made on the assumption that the DNN is used as the scheme of estimation based on machine learning.

The joint information calculation unit 302 calculates joint information using the DNN based on the silhouette information obtained from the silhouette information generation unit 20 and the joint learning result obtained from the joint information learning unit 301 (ACT311). The joint information calculation unit 302 outputs the calculated joint information to an external device (ACT312).

This is the end of the operations of the estimation process by the joint information generation unit 30 shown in the flowchart of FIG. 10.

As described above, the estimation device 1 according to one embodiment of the present invention includes the time-series information generation unit 10, which obtains an image group (first image group) including a plurality of successive time-series images including a reference image, and generates time-series information (first time-series information) based on the difference between the reference image and each of the other images in the image group (first image group) than the reference image. The estimation device 1 further includes the learning unit 200 (first learning unit), which performs machine learning using the reference image and the time-series information (first time-series information), thereby obtaining a learning result (first learning result) that is to be used for estimating depth information on a target image, which is an image to be processed, and silhouette information on a subject captured in the target image based on the target image and time-series information (second time-series information) generated from an image group (second image group) including a plurality of successive time-series images including the target image.

With the configuration described above, the estimation device 1 can learn information on a joint of a subject in an occlusion region in an image.

The estimation device 1 according to the embodiment of the present invention further includes the estimation unit (first estimation unit), which estimates the depth information on the target image and the silhouette information on the subject captured in the target image using the learning result (first learning result) obtained from the learning unit 200, the target image and the time-series information (second time-series information).

With the configuration described above, the estimation device 1 estimates the silhouette information that takes the occlusion into account using the time-series information. In this way, the estimation device 1 can use information on images (frames) preceding and following the image (frame) including an occlusion region and therefore can estimate the silhouette information on the occlusion region in more robustly than prior art.

With the configuration described above, the estimation device 1 can estimate depth information and silhouette information on the reference image (target image). Therefore, the estimation device 1 can recognize the relative positional relationship in the depth direction between a subject whose silhouette needs to be estimated (that is, a subject in the background that includes an occlusion region) and a subject (a subject in the foreground) hiding the subject whose silhouette needs to be estimated. Therefore, the estimation device 1 can estimate the silhouette information by taking into account the relative positional relationship in the depth direction between the subject in the foreground and the subject in the background.

With the configuration described above, the estimation device 1 can estimate joint information by using the silhouette information estimated by including the occlusion region. Therefore, the estimation device 1 can estimate information on joints in the occlusion region more robustly than prior art.

Although an embodiment of the present invention has been described above in detail with reference to the drawings, specific configurations are not limited to this embodiment, and various other designs or the like are included in the present invention without departing from the spirit of the present invention.

A part or the whole of the estimation device 1 according to the embodiment described above may be implemented by a computer. In that case, a program for implementing the control functionality of the estimation device 1 may be recorded in a computer-readable recording medium, the program recorded in the recording medium may be loaded into a computer system, and the computer system may execute the program to achieve the control functionality.

The "computer system" referred to herein is a computer system incorporated in the estimation device 1, which includes an OS and hardware including peripheral devices. The "computer-readable recording medium" refers to a portable medium, such as a flexible disk, a magnetooptical disk, a ROM or a CD-ROM, or a storage device, such as a hard disk drive incorporated in a computer system.

The "computer-readable recording medium" may include a medium that dynamically retains a program for a short time, such as a communication line in a case where a program is transmitted over a network such as the Internet or a communication line such as a telephone line, or a medium that retains a program for a certain time, such as a volatile memory in a computer system serving as a server or client in such a case. Alternatively, the program may be designed for implementing a part of the functionality described above or may be combined with a program already recorded in the computer system to implement the functionality described above.

Alternatively, a part or the whole of the estimation device 1 according to the embodiment described above may be implemented as an integrated circuit, such as a large-scale integration (LSI) circuit. Each functional block of the estimation device 1 may be implemented by a separate processor, or some or all of the functional blocks of the estimation device 1 may be integrated into a single processor.

The integrated circuit is not limited to the LSI but may be a dedicated circuit or a general-purpose processor. Furthermore, if the semiconductor technology develops and a new type of integrated circuit replacing the LSI appears, the new integrated circuit can also be used.

REFERENCE SIGNS LIST

1 Estimation Device
10 Time-Series Information Generation Unit
20 Silhouette Information Generation Unit
30 Joint Information Generation Unit
101 Image Difference Calculation Unit
200 Learning Unit
201 Depth Information Learning Unit
202 Silhouette Information Learning Unit
203 Estimation Unit
204 Depth Information Calculation Unit
205 Silhouette Information Calculation Unit
301 Joint Information Learning Unit
302 Joint Information Calculation Unit

The invention claimed is:

1. A learning device, comprising:
a processor; and
a storage medium having computer program instructions stored thereon, where executed by the processor, perform to:
obtain a first image group including a plurality of successive time-series images including a reference image and generates first time-series information based on a difference between the reference image and each of the images in the first image group other than the reference image; and
performs machine learning using the reference image and the first time-series information, thereby obtaining a first learning result that is to be used for estimating depth information on a target image, which is an image to be processed, and silhouette information on a subject captured in the target image based on the target image and second time-series information generated from a second image group including a plurality of successive time-series images including the target image.

2. The learning device according to claim 1, wherein the computer program instructions further perform to obtain the first learning result, which indicates configuration information and parameter information on a deep neural network that receives the reference image and the first time-series information and outputs the depth information on the reference image and the silhouette information on the subject captured in the reference image.

3. An estimation device, comprising:
a processor; and
a storage medium having computer program instructions stored thereon, where executed by the processor, perform to:
estimate the depth information on the target image and the silhouette information on the subject captured in the target image by using the first learning result obtained from the learning device according to claim 1, the target image and the second time-series information.

4. The estimation device according to claim 3, wherein the computer program instructions further perform to:
perform machine learning using the silhouette information on the subject captured in the reference image, thereby obtaining a second learning result that is to be used for estimating joint information on the subject captured in the target image using the silhouette information on the subject captured in the target image; and
estimate the joint information on the subject captured in the target image by using the silhouette information on the subject captured in the target image and the second learning result.

5. A learning method, comprising:
a time-series information generation step of obtaining a first image group including a plurality of successive time-series images including a reference image and generating first time-series information based on a difference between the reference image and each of the images in the first image group other than the reference image; and
a learning step of performing machine learning using the reference image and the first time-series information, thereby obtaining a learning result that is to be used for estimating depth information on a target image, which is an image to be processed, and silhouette information on a subject captured in the target image based on the target image and second time-series information generated from a second image group including a plurality of successive time-series images including the target image.

6. An estimation method, comprising:
an estimation step of estimating the depth information on the target image and the silhouette information on the subject captured in the target image by using the learning result obtained by the learning method according to claim 5, the target image and the second time-series information.

7. A non-transitory computer readable medium including instructions executable by one or more processor to:
obtain a first image group including a plurality of successive time-series images including a reference image;
generate first time-series information based on a difference between the reference image and each of the images in the first image group other than the reference image; and
perform machine learning using the reference image and the first time-series information, thereby obtaining a learning result that is to be used for estimating depth information on a target image, which is an image to be processed, and silhouette information on a subject captured in the target image based on the target image and second time-series information generated from a second image group including a plurality of successive time-series images including the target image.

8. The non-transitory computer readable medium of claim 7 further including instructions executable by one or more processor to estimate the depth information on the target image and the silhouette information on the subject captured in the target image by using the learning result obtained, the target image and the second time-series information.

* * * * *